United States Patent
Richter

(10) Patent No.: US 6,991,214 B2
(45) Date of Patent: Jan. 31, 2006

(54) MICROVALVE NORMALLY IN A CLOSED POSITION

(75) Inventor: Martin Richter, Munich (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 124 days.

(21) Appl. No.: 10/381,630

(22) PCT Filed: Sep. 25, 2001

(86) PCT No.: PCT/EP01/11070

§ 371 (c)(1),
(2), (4) Date: Sep. 23, 2003

(87) PCT Pub. No.: WO02/27194

PCT Pub. Date: Apr. 4, 2002

(65) Prior Publication Data

US 2004/0036047 A1 Feb. 26, 2004

(30) Foreign Application Priority Data

Sep. 29, 2000  (DE) ........................................ 100 48 376

(51) Int. Cl.
*F15C 5/00* (2006.01)

(52) U.S. Cl. ................................................ 251/129.06
(58) Field of Classification Search ............. 251/129.06
See application file for complete search history.

(56) References Cited

U.S. PATENT DOCUMENTS

| 5,538,221 A | 7/1996 | Joswig |
| 5,791,375 A | 8/1998 | Pan et al. |
| 5,865,417 A | * 2/1999 | Harris et al. .................. 251/11 |
| 5,901,939 A | 5/1999 | Cabuz et al. |
| 6,142,444 A | 11/2000 | Kluge |
| 6,149,123 A | 11/2000 | Harris et al. |

FOREIGN PATENT DOCUMENTS

| DE | 41 38 491 | 5/1993 |
| DE | 197 35 156 | 4/1999 |
| EP | 0 546 427 | 6/1993 |
| EP | 1 008 765 | 6/2000 |
| WO | WO 92/04569 | 3/1992 |
| WO | WO 98/13605 | 4/1998 |
| WO | WO 99/38551 | 8/1999 |

* cited by examiner

*Primary Examiner*—J. Casimer Jacyna
(74) *Attorney, Agent, or Firm*—Beyer Weaver & Thomas LLP

(57) ABSTRACT

A microvalve with a normally closed state includes a membrane, an actuation means for controllable deformation of the membrane as well as a valve shutter deformable by the controllable deformation of the membrane. The valve shutter at least partially opposes the membrane and rests, in a first position in the normally closed state of the valve, along a sealing lip arranged between the valve shutter and the membrane. The sealing lip is arranged such that an outlet of the valve, which outlet is in fluid communication with an interrupted section of the sealing lip, is sealed against an input channel bordering on the valve shutter. In addition, the valve shutter is moldable into a second position so as to bring the outlet into fluidic communication with the input channel in an open state of the valve.

14 Claims, 7 Drawing Sheets

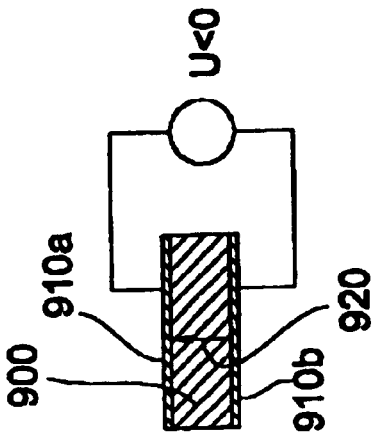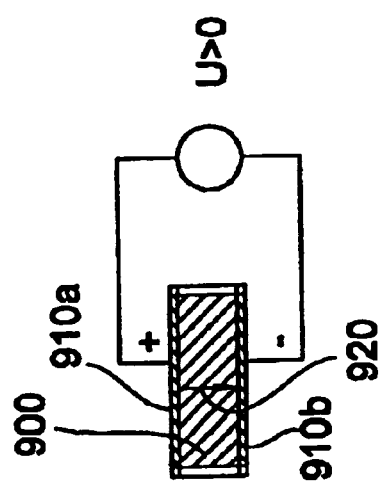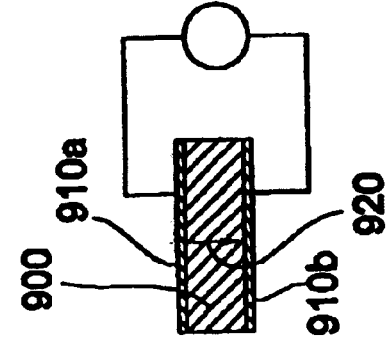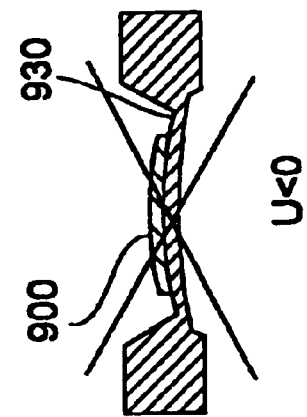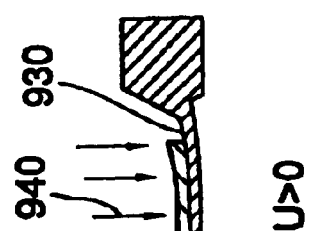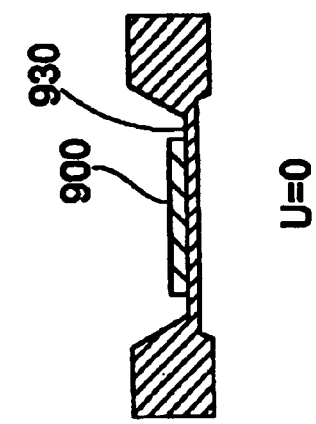

MICROVALVE NORMALLY IN A CLOSED POSITION

BACKGROUND OF THE INVENTION

1. Field of the Invention

The present invention relates to components which are micromechanically structured, and in particular to microvalves as are used, for example, in medical engineering or in pneumatics, and to micropumps using such microvalves.

2. Description of Prior Art

The growing demand for miniaturized and integrated systems has recently led to the development of micromechanic structural parts, such as microvalves and micropumps. In order to effect the necessary mechanical actuation of such components, frequent use is made of piezoceramics which contract in the direction of polarization of the piezoceramic upon application of voltage.

To illustrate the operation of such piezoceramics, FIGS. 6a, 6b and 6c show the state of a piezoceramic in three different voltage drive states. The piezoceramic 900, shown in FIGS. 6a to 6c, has metallizations 910a and 910b on two opposing outer surfaces of piezoceramic 900. Metallization 920a and 920b oppose each other in the direction of the direction 920 of polarization of piezoceramic 900, the voltage U applied to same is zero in FIG. 6a, whereas the voltage is positive in FIG. 6b and negative in FIG. 6c. As can be seen, piezoceramic 900 contracts in a direction transverse to the direction of polarization in the case where the voltage U applied is positive, in comparison to the case where the voltage U applied is zero. Due to the flatness of the piezoceramic, which is, for example, 5 µm, in comparison with an edge length of, for example, 5 mm, a contraction in the direction of polarization is small. The application of a voltage U in the opposite direction of the direction of polarization 920 does not lead to an expansion but to a depolarization of piezoceramic 900, as is indicated by the arrow 920 which is reversed in comparison with the arrows 920a and 920b shown in FIGS. 6a and 6b.

In order to implement the contractive effect of the piezoceramic, as is represented in FIGS. 6a to 6c, in a suitable manner, use is made, for example, as is known, of a combination of a membrane and a piezoceramic fixed to the same, an example of a bending converter obtained from such a combination being shown in FIGS. 7a, 7b and 7c. A bending converter consists of a piezoceramic 900 which is firmly connected, on a main side, to a membrane 930. While FIG. 7a represents the voltage drive state, since the voltage applied to piezoceramic 900 is zero, FIGS. 7b and 7c show those voltage drive states where the voltage applied to piezoceramic 900 is positive and negative, respectively. If ceramic 900 contracts when a voltage which is positive along the direction of polarization is applied, the firm connection of piezoceramic 900 to membrane 930 causes membrane 930 to bend, as is shown by arrows 940 in FIG. 7b. Consequently the contraction of piezoceramic 900 is converted to a stroke of membrane 930 in a direction 940 away from piezoceramic 900 when a positive voltage is applied to piezoceramic 900. Even though an expansion of piezoceramic 900 and, as a consequence, bending of membrane 930 in the opposite direction should be expected when an inverse voltage, i.e. a voltage which is negative in the direction of polarization, is applied, this voltage drive is small and cannot be utilized in a technical manner since it would lead to a depolarization of piezoceramic 900, this being illustrated by the fact that FIG. 7c is crossed out.

Even though the bending converter described with reference to FIGS. 7a to 7c is fast, exhibits low energy consumption, large/high stroke and a strong force, and, in addition, has the advantage, in particular with regard to employment in microfluidics, that it causes the medium to be switched to be separated from the piezoceramic, a drawback of this type of bending converter is that it can only carry out an active movement in the direction of the membrane (downward in FIGS. 7a to 7c) due to the unsymmetrical nature of the piezoeffect as has been described with reference to FIGS. 6a to 6c. An inverse movement (upward) can only be realized by the bending converter if a voltage is applied in the opposite direction of the direction of polarization, which, however, leads to a depolarization of the piezoceramic even at minor field strengths in the opposite direction. Typical depolarization field strengths of piezoceramics are roughly −4000 V/cm.

A known microvalve uses the bending converter described above so as to realize a valve function wherein the valve is normally open. Such a known normally-open microvalve (in the following referred to as NO valve) is shown in FIGS. 8a and 8b, FIG. 8a representing the closed state of the valve and FIG. 8b representing the normally-open state of the valve. As is shown in FIGS. 8a and 8b, such a conventional NO valve includes a bending converter such as has been described above, which consists of a piezoceramic 900 and a membrane 930, as well as a valve seat arranged below membrane 930 and comprised of a sealing lip 960 which surrounds an opening 970. As is shown in FIG. 8b, in the normally-open case, i.e. if no voltage is applied to the piezoceramic, membrane 930 is spaced apart from sealing lip 960 so that, as is shown by an arrow 980 in FIG. 8b, a fluid may penetrate through opening 970. If a positive voltage is applied to piezoceramic 900, membrane 930 moves, due to the bending as has been explained with reference to FIGS. 7a to 7c, in the direction of sealing lip 960, with the membrane 930 resting, in the fully closed position, on sealing lip 960 so as to close opening 970.

One drawback of the NO valve described above is that, if the voltage applied to the piezoceramic is switched off or interrupted, the membrane returns to its resting position where it is spaced apart from the valve seat, whereby the valve enters into an open state. However, many areas of application, such as medicine, require valves which are closed in their normal state. In drug administration, it must be ensured, for example, that no drug is administered to the patient in the case of a power failure, so as to avoid that the patient is administered an overdose. To prevent this, a "normally closed" function is required.

SUMMARY OF THE INVENTION

It is the object of the present invention to provide a microvalve with a normally closed state.

In accordance with an aspect of the present invention this is achieved by an inventive microvalve with a normally closed state comprising a membrane, an actuation means for controllable deformation of the membrane as well as a valve shutter which is deformable by the controllable deformation of the membrane. The valve shutter at least partially opposes the membrane and rests, in a first position in the normally closed state of the valve, along a sealing lip arranged between the valve shutter and the membrane. The sealing lip is arranged such that an outlet of the valve, which outlet is in fluidic communication with an interrupted section of the sealing lip, is sealed in a fluidtight manner against an input channel bordering on the valve shutter. In addition, the valve shutter is deformable into a second position so as to bring the outlet into fluidic communication with the input channel in an open state of the valve.

The present invention is based on the observation that the input pressure exerted on the valve by the fluid to be switched can be used for pressing a valve shutter, such as a flap, against sealing lips so as to close the valve. For opening the valve, merely an actuation means is required which shifts the valve shutter from the closed position to the open position. In this way it is ensured that the valve remains closed in case of a power failure or other incidents.

In accordance with one embodiment the valve shutter may be a shutter flap engaged near the interrupted section of the sealing lip, the deformation of the valve shutter corresponding to a flap-like bending of the shutter flap. Opening the shutter flap creates a gap through which the fluid to be switched may flow.

The valve shutter, such as, for example, the shutter flap, may be formed so as to be thicker in one or several places, may be stiffened or may exhibit ribs so as to prevent, on the one hand, bending of the shutter flap in non-engaged, undesired places in the open state of the valve, which would otherwise lead to an undesired closing of the shutter flap due to the inlet pressure, and so as to avoid, on the other hand, bending of the shutter flap due to the inlet pressure in the normally closed state of the valve, which bending might otherwise cause the shutter flap to rest, in an oblique manner, along the sealing lip so that poor sealing is achieved. In order to further reduce bending of the valve shutter in the normally closed state of the valve, supporting elements may be provided in suitable places between the membrane and the valve shutter which prevent the valve shutter from bending.

In accordance with a further embodiment the valve shutter is a bendable membrane engaged at two opposing edge portions. If the bendable membrane bends due to a deformation of the membrane, two opposing gaps result through which a medium to be switched may flow to the outlet.

On one side of the membrane which opposes the valve shutter, a tappet may be provided. This yields the advantage, on the one hand, that less deformation and/or less stroke is required to press open the valve shutter, and, on the other hand, that the flow resistance of the penetrating fluid may be reduced during the open state of the valve since the distance between the membrane and the shutter flap can be selected freely by means of the height of the tappet and does not depend on the maximum stroke and/or the maximum deformation of the membrane.

The sealing lip may be guided in a meander-like or in another fashion so as to increase the length of the sealing lip at which the fluid may pass in the open state of the valve. This is advantageous particularly in pneumatics since higher throughput rates may thereby be achieved.

In accordance with a specific embodiment the NC valve, or the normally closed valve, consists of a first chip and a second chip. The first chip includes the membrane, on which the tappet and a piezoceramic as an actuation means are mounted on opposing sides, and the sealing lip, which surrounds the rectangular membrane along three sides. The second chip includes the shutter flap as the valve shutter, the shutter flap being fixed near that side of the membrane on which the sealing lip is interrupted and does not surround the membrane.

The first chip and the second chip are bonded such that the shutter flap at least partially opposes the membrane and that the shutter flap is higher than the sealing lip. An advantage of this arrangement is that a bonding step that does not make use of a joining layer may be used for connecting the two chips, so that no space results between the tappet 120 and the shutter flap 180, so that the reproducibility of the valve is increased due to the non-occurrence of variations in the thickness of adhesive, and that, in addition, media resistance and tolerance is improved. Furthermore, a valve thus formed may easily be integrated into a microfluid system formed from a chip, whereby a microfluid system having a smaller dead volume and thus shorter switching times may be obtained, which is advantageous particularly in pneumatics.

One advantage of the inventive valve is that it exhibits a normally closed state, so that it is closed even if power supply fails or is interrupted in any other way. Another advantage is that the inventive valve can be easily integrated in existing microsystems.

A further advantage of the present invention is that, due to the fact that the circumference of the valve shutter is freely selectable and can be designed to be large, higher throughput rates may be achieved than with conventional valves, in which merely one small opening is pressed shut by an active element.

Due to the provision of a membrane for separating the actor from the fluid to be switched, the inventive valve is suitable, as opposed to valves which, for example, use electrostatic attraction as the switching force, both for liquids and gases or mixtures of same, whereby the range of application of the valve is increased.

In accordance with one embodiment the inventive NC valve is connected upstream from a micromembrane pump, the micromembrane pump and the NC valve being mounted on a carrier substrate comprising connecting channels which connect same.

In accordance with a further embodiment a microperistaltic pump is formed from to inventive NC valves which are connected with each other via a pumping chamber having a pumping membrane and are arranged back to back. The peristaltic pump thus obtained may be realized in a one-chip solution and is moreover self-locking in both directions even if no voltage is applied.

A further embodiment provides a 3/2-way microvalve on a chip, an inventive NC valve and a conventional NO valve being used for this.

BRIEF DESCRIPTION OF THE DRAWINGS

With reference to the accompanying drawings, preferred embodiments of the present invention will be described in more detail below, wherein

FIGS. 6a, 6b and 6c show diagrams illustrating the voltage drive of a piezoceramic, the voltage applied to the piezoceramic in the direction of polarization is zero in FIG. 6a, is positive in FIG. 6b and is negative in FIG. 6c;

FIGS. 7a, 7b and 7c show diagrams illustrating the movement of a membrane of a bending converter with a piezoceramic at different voltage drive states, the voltage applied to the piezoceramic in the direction of polarization being zero in FIG. 7a, positive in FIG. 7b and negative in FIG. 7c.

DESCRIPTION OF PREFERRED EMBODIMENTS OF THE INVENTION

Figure 1A:
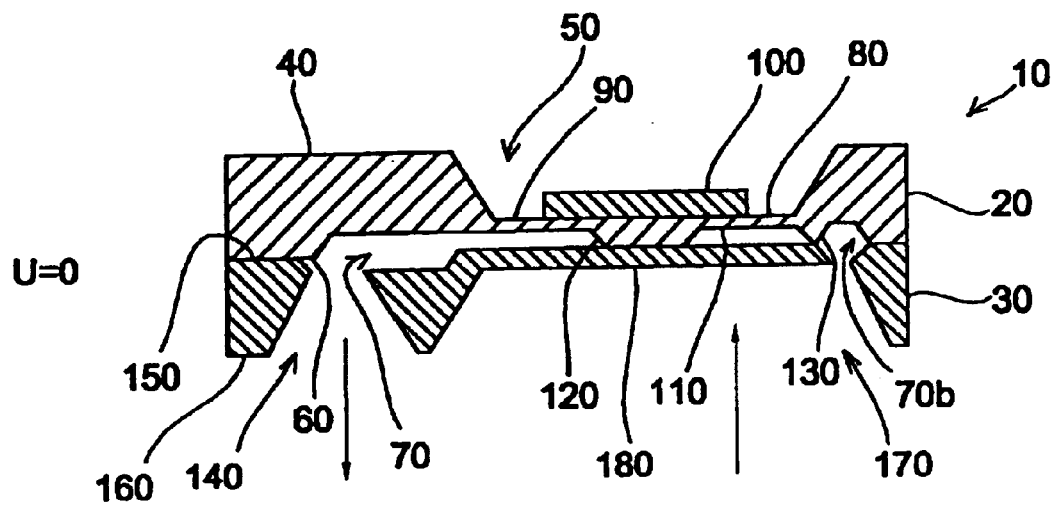
FIGS. 1a and 1b show side sectional views of an embodiment of an NC valve in accordance with the present invention, FIG. 1a representing the normally closed state of the valve and FIG. 1b representing the open state of the valve.

Before various embodiments of the present invention will be described with reference to the figures, it shall be pointed out that like elements in the various figures have been provided with like reference numerals and that a repeated explanation of identical elements will be omitted in the description of the figures so as to avoid repetitions in the description.

Figure 1B:
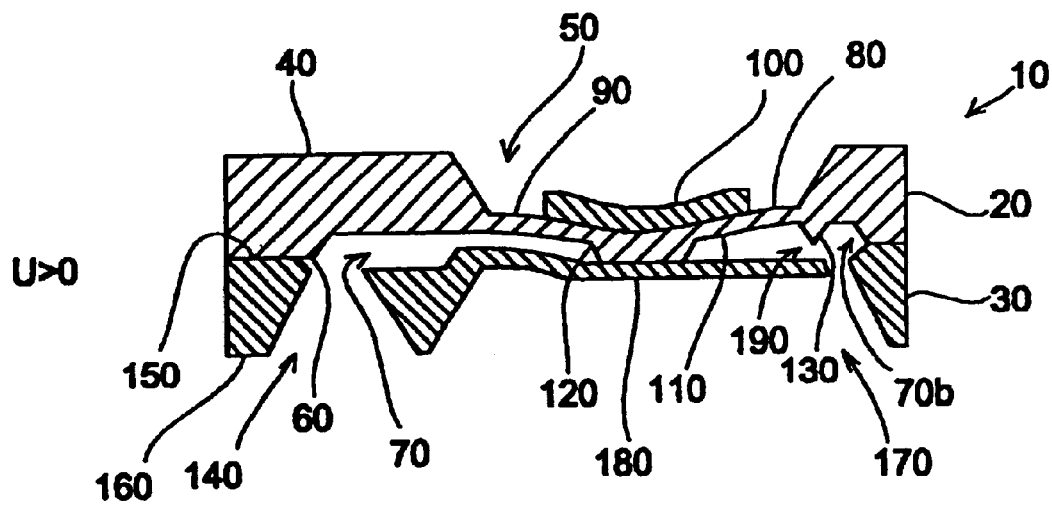
Figure 2A:
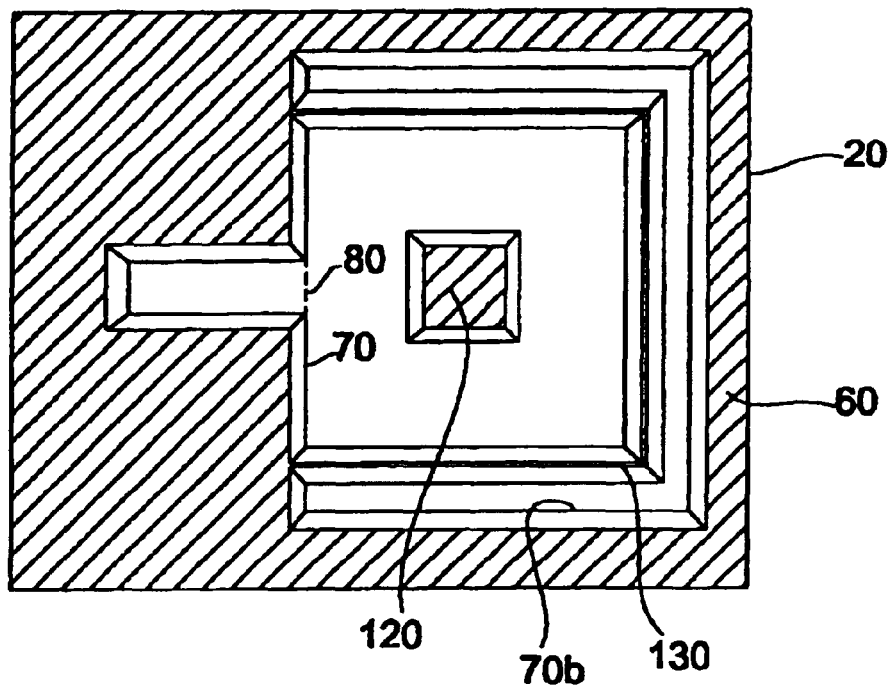
FIGS. 2a and 2b show a bottom view of an actor chip and a top view of a flap chip, respectively, of the NC valve of FIGS. 1a and 1b in the normally closed state of the valve.
Figure 2B:
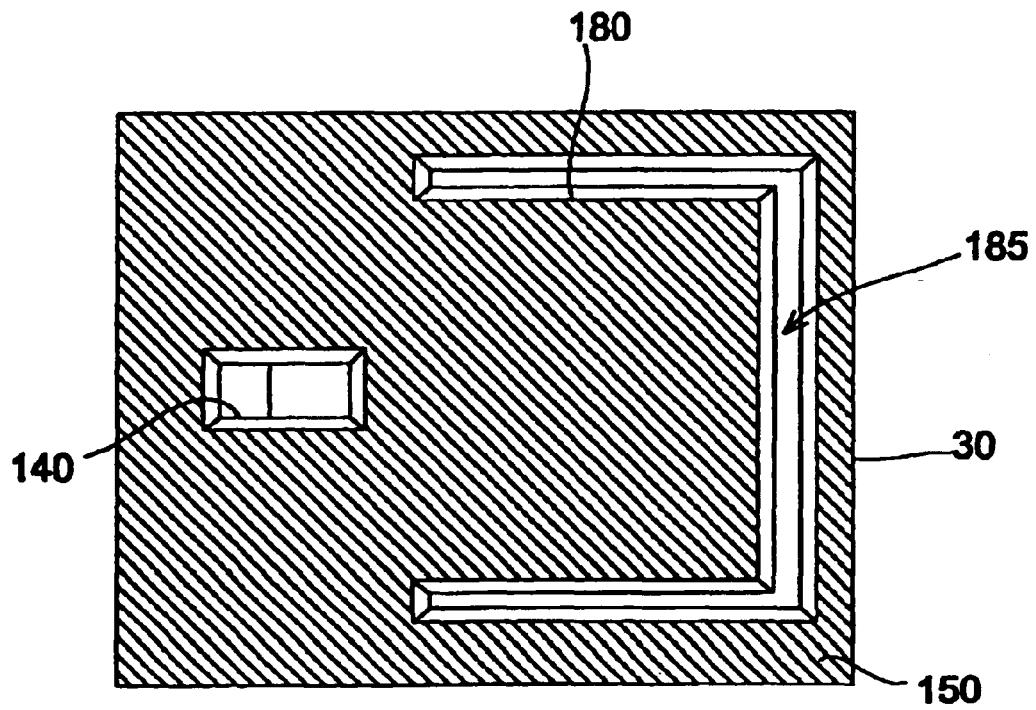

With reference to FIGS. 1a, 1b, 2a and 2b, an embodiment of an NC valve in accordance with the present invention will initially be described, wherein FIGS. 1a and 1b show side sectional views of the valve in a normally closed state and an open state, respectively, of the valve, and FIGS. 2a and 2b show a bottom view of an actor chip and a top view of a flap chip, respectively, of the valve in the normally closed state of the valve. It shall be pointed out that FIGS. 1a, 1b, 2a and 2b show the structures, by way of example, with slopes such as occur in KOH etching, it being possible, however, to produce the structures shown in another manner without slopes.

As can best be seen in FIGS. 1a and 1b, the NC valve 10 consists of a first chip, or an actor chip, 20 as well as a second chip, or a flap chip, 30. Actor chip 20 comprises a dip or recess 50 on a first main side 40 and a dip 70 on an opposing main side 60, a membrane 80, which will be referred to as actor membrane hereinafter, being formed through both dips 50 and 70. A piezoceramic 100 is arranged on a first side 90 of the actor membrane, while a tappet 120 protrudes on a second side 110 of actor membrane 80.

FIG. 2a shows tappet 120, dip 70 and, by means of the dashed line, the area of the dip which forms actor membrane 80, seen from main side 60 of actor chip 20, wherein actor membrane 80 and tappet 120 are formed essentially square-shaped in the lateral direction and further are arranged in a centered arrangement. It can further be seen that membrane 80 is surrounded by a sealing lip 130 along three of its four sides or edge sections. As can best be seen in FIGS. 1a and 1b, sealing lip 130 is arranged on main side 60 of actor chip 20—main side 60 being structured, for example, simultaneously with tappet 120—so as to protrude there, and exhibits a cross-section which corresponds essentially to a triangle with a flattened tip.

Flap chip 30 is connected to actor chip 20 and includes an outlet region or an outlet port 140 which forms a passageway extending from a first main side 150 to a second main side 160 of flap chip 30, as well as an input channel region 170 formed by a dip in the second main side 160 which extends to a shutter flap or a flap membrane 180. As is shown in FIG. 2b, the shutter flap is formed in a square shape, any other form being also possible, however, and is freely movable, via a slot 185, on three of its four side or edges, relative to the rest of flap chip 30, the shutter flap being fixed to or engaged on the fourth side. Valve flap 180 extends somewhat beyond the lateral extension of sealing lip 130 along its lateral extension so that in the normally closed state of valve 10, input channel region 170 is limited laterally by flap chip 30, and is limited against outlet region 140 by valve flap 180, sealing lip 130 and a part 70b of dip 70, wherein part 70b surrounds sealing lip 130. It must be noted that the shape of input channel region 170 is also essentially square in this embodiment in the lateral direction, i.e. parallel to the drawing plane of FIGS. 2a and 2b, even though this cannot be seen in FIGS. 2a and 2b, it also being possible to use other shapes.

It shall be pointed out that a bending converter is realized, by piezoceramic 100 and actor membrane 80, the operation of which has been described with reference to FIGS. 6a to 6c and 7a to 7c. In particular, in the embodiment shown, the bending converter consists of a piezoceramic 100 on which metallizations are formed on sides opposing each other in the direction of the direction of polarization, and which exhibits a high d31 or charge coefficient. Membrane 80 consists of silicon, but other materials are also possible. However, piezoceramic 100 is mounted to silicon membrane 80 by means of a suitable adhesive. The silicon piezoelectric bending converter thus formed is adapted such that actor membrane 80 is still able, at an applied voltage swing at a specified counterpressure, to become deflected by a distance, or stroke, which is also specified. In this silicon bending converter, typical values are 1 to 10 bar for the counterpressure, 5 to 40 μm for the stroke, 4 to 15 mm for the side length of the actor membrane and 1 ms for the switching time.

One possible method of manufacturing the NC valve described above will be described briefly below. At first, actor chip 20 and flap chip 30 undergo an etching process, such as, for example, anisotropic KOH etching, so as to form dip 50, dip 70, membrane 80, tappet 120 and sealing lip 130, and/or to form outlet region 140, input channel region 170 as well as shutter flap 180. Then, both chips 20 and 30 are bonded with each other in a wafer-bonding step that does not make use of a joining layer, such as the silicon fusion wafer bond. After the wafer-bonding step, tappet 120 firmly adheres to shutter flap 180, and the edge of shutter flap 180 firmly adheres to sealing lip 130. The edge of the flap is released again from the sealing lip by etching from principle side 160 of flap chip 30. The etching time may either be selected to be long enough that, in addition to the sealing lip, the tappet is also released from the shutter flap, or the etching time is selected to be shorter so as to release only the sealing lip, and not the tappet, from the shutter flap. For this purpose, the thickness of an oxide layer applied onto principle side 60 before the waferbonding step is preferably selected such that places that are to be etched free after wafer-bonding can be etched free by lateral underetching. Principle side 40 of actor chip 20 may be coated with aluminum, for example, so as to serve as a contact for piezoceramic 100.

The operation of the NC valve of FIGS. 1a, 1b, 2a and 2b will be explained below. As can be seen in FIG. 1a, the shutter flap is arranged such that the lateral dimensions of shutter flap 180 are larger than circumferential sealing lip 130 of actor chip 20, and that the inlet pressure, applied to shutter flap 180 bordering on input channel region 170 in the input channel region 170 by a fluid to be switched, has a closing effect. Without application of voltage to piezoceramic 100 and, thus, without any application of pressure to shutter flap 180, shutter flap 180 is therefore closed. For opening valve 10 a voltage which is positive in the direction of polarization is applied to the silicon piezoelectric bending converter formed by piezoceramic 100 and membrane 80, whereby the silicon piezoelectric bending converter presses open sealing flap 180 against the inlet pressure using tappet 120. To be precise, the positive voltage applied to piezoceramic 100 in the direction of polarization causes membrane 80 to be moved, along with tappet 120, in the direction of valve flap 180, which bends open due to the pressure of tappet 120 and forms a gap 190 between itself and sealing lip 130, as can be seen in FIG. 1b.

It shall be pointed out that gap 190 arises along the three freely movable edge sections of valve flap 180, and that therefore any fluid that may be present in input channel region 170 may flow around three edges of valve flap 180 so as to reach outlet region 140, even though this cannot be seen in FIG. 1b which shows merely a side sectional view. In order to prevent the valve flap from being bent toward sealing lip 130 due to the inlet pressure and to the relatively strong levering effect at the freely movable edge sections of valve flap 180, it may be advantageous to design the thickness of the shutter flap such that the shutter flap can be very easily bent near the engagement location, and that the shutter flap is reinforced in particular in the area opposing the engagement location via tappet 120 and does not bend there at all, if possible. In this way one prevents, for example, that valve flap 180 does not bend back to sealing lip 130 in the picture of FIG. 1b, which prevents gap 190 from narrowing or even closing along the edge, of valve flap 180, opposing the engagement location, in the open state of valve 10. The stiffening of valve flap 180, by which same is formed to be thicker in certain places, can further be used to prevent, in the normally closed state of valve 10, shutter flap 180 from bending due to the inlet pressure, whereby the leaking rate of the valve can be reduced since shutter flap 180 also rests upon the corners of sealing lip 130.

Further it is to be noted that the height of tappet 120 and/or the depth of dip 70 is selected such that the flow resistance of the fluid to be switched through gap 190, which is about to form, and the space between actor membrane 80 and shutter flap 180, remains low in the open state of valve 10. The depth of dip 70 is, for example, 100 to 300 μm.

Even though it is not shown in FIGS. 1a, 1b, 2a and 2b, supporting elements may be provided between actor membrane 80 and shutter flap 180 in suitable places, such as, for example, near right-hand corners, as seen from the observer's perspective, which supporting elements may preferably be provided on actor membrane 80 or on shutter flap 180. These supporting elements prevent shutter flap 80 from bending in the region between tappet 120 and sealing lip 130 in the normally closed state of NC valve 10, and therefore prevent shutter flap 180 from resting on sealing lip 130 in an oblique manner. In this way, the seal in the normally closed state of valve 10 can be improved. If the supporting elements are provided on actor membrane 80, they preferably have a very narrow cross-section so as not to affect the bending properties of actor membrane 80, and they are preferably formed in the same etching steps as tappet 120 and sealing lip 130, and are released from shutter flap 180 after bonding.

With reference to FIGS. 3 to 5a and 5b, embodiments shall be described below wherein the NC valve described with reference to FIGS. 1a, 1b, 2a and 2b is used.

Figure 3:
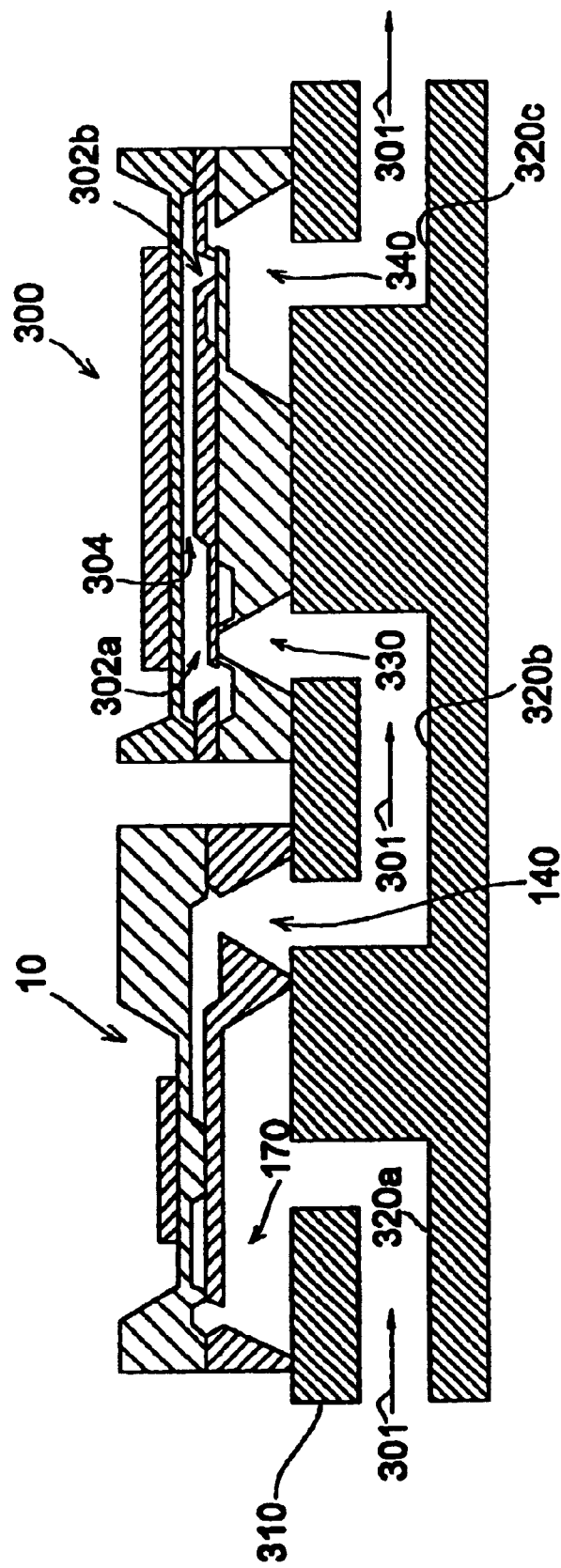
FIG. 3 shows a side sectional view of an embodiment wherein the NC valve of FIGS. 1a, 1b, 2a and 2b is connected upstream from a micromembrane pump.

FIG. 3 shows a hybrid combination of the NC valve 10 having a micromembrane pump, the micromembrane pump 300, which comprises two passive non-return valves 302a and 302b aligned in opposing directions and a pumping chamber 304, and the NC valve being arranged on a carrier substrate 310 having channels 320a, 320b and 320c formed therein. In particular, the connecting channel 320a is connected to input channel region 170 of NC valve 10, whereas connecting channel 320b brings outlet region 140 into fluidic communication with an input 330 of micromembrane pump 300. Connecting channel 320 is connected to the output 340 of micromembrane pump 300.

An arrangement is achieved which is self-locking in both flow directions without any voltage applied, due to the operation of NC valve 10. In this way, the arrangement is suitable as a self-locking micropump for medical engineering. A further advantage of using the NC valve in this arrangement is that high flow rates can be achieved in that NC valve 10 is optimized toward a low flow resistance, in that, as has been mentioned above, the height of the tappet is suitably adjusted, and in that the micromembrane pump is designed with a view to a high throughput.

Figure 4:
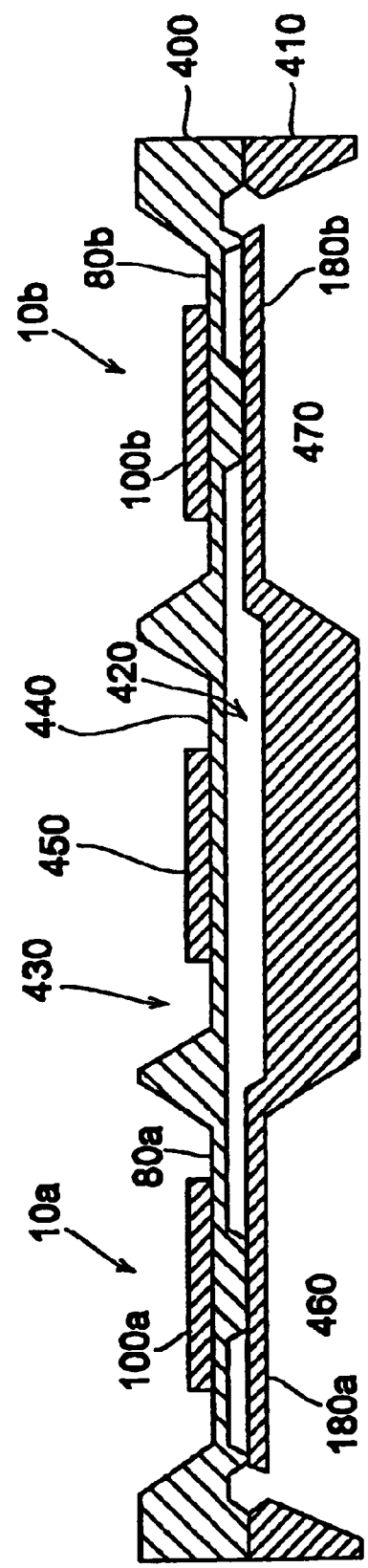
FIG. 4 shows a side sectional view of an embodiment of a peristaltic pump consisting of two NC valves arranged back to back which correspond to that shown in FIGS. 1a, 1b, 2a and 2b.

FIG. 4 shows an embodiment of a peristaltic pump wherein two NC valves 10a and 10b, arranged back to back, are used which correspond to that described with reference to FIGS. 1a, 1b, 2a and 2b, with the exceptions to be described hereinbelow. As can be seen in FIG. 4, both actor chips and both flap chips of NC valves 10a and 10b are integrated into a single chip 400 and 410, respectively. Both outlet regions of NC valves 10a and 10b have been replaced by a pumping chamber 420 extending between both chips 400 and 410 and connecting the regions located between actor membrane 80a and 80b and valve flaps 180a and 180b of valve 10a and of valve 10b. Above pumping chamber 420, chip 400 exhibits a dip 430, whereby a pumping membrane 440 is formed. On that side of pumping membrane 440 which is facing away from pumping chamber 420, a piezoceramic 450 is mounted. The voltages applied to piezoceramics 100a and 100b of both NC valves 10a and 10b as well as to piezoceramic 450 are driven in a suitable manner so as to achieve a pumping action from a gate 460, formed by the input channel region of NC valve 10a, to a gate 470, formed by the input channel region of NC valve 10b, or vice versa.

The architecture of a peristaltic pump, as has been described with reference to FIG. 4 by means of two NC valves, as have been described with reference to FIGS. 1a, 1b, 2a and 2b, is advantageous in that the peristaltic pump is self-locking in both directions even in a de-energized state, i.e. even in the case of a voltage breakdown. In addition, the peristaltic pump can be realized in a one-chip solution.

However, it shall be pointed out that the dip depth of NC valves 10a and 10b is preferably only 10 to 50 μm in the present case, contrary to the above description, so as to achieve a high compression ratio (compression ratio=stroke volume of the pumping membrane/dead volume of the pumping chamber) and therefore a desirably high tolerance of the pump with respect to bubbles. Due to the gap flows occurring as a consequence, limited flow rates of the pump must be expected. The choice of the dip depth therefore represents a compromise between the highest possible flow rate and the highest possible tolerance toward bubbles.

Figure 8A:
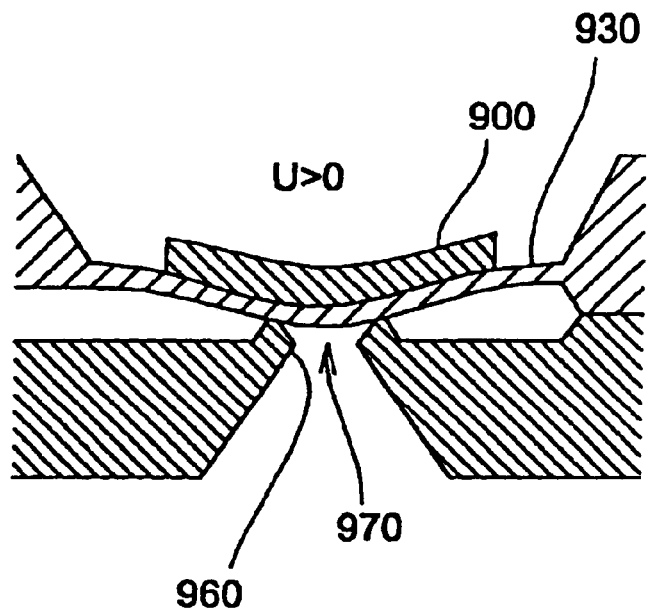
FIGS. 8a and 8b show a side sectional view of a conventional NO valve, FIG. 8a representing the closed state of the valve and FIG. 8b representing the normally-open state of the valve.
Figure 8B:
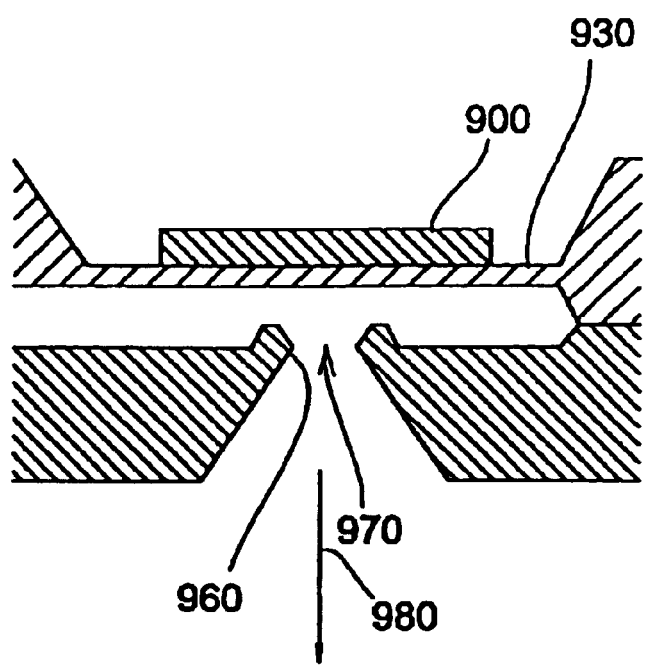

It shall be pointed out, with reference to FIG. 4, that it is further possible to construct a peristaltic pump which uses only an NC valve corresponding to that shown in FIGS. 1a, 1b, 2a and 2b, and which uses, as a second valve, a valve shown, for example, in FIG. 8.

Figure 5A:
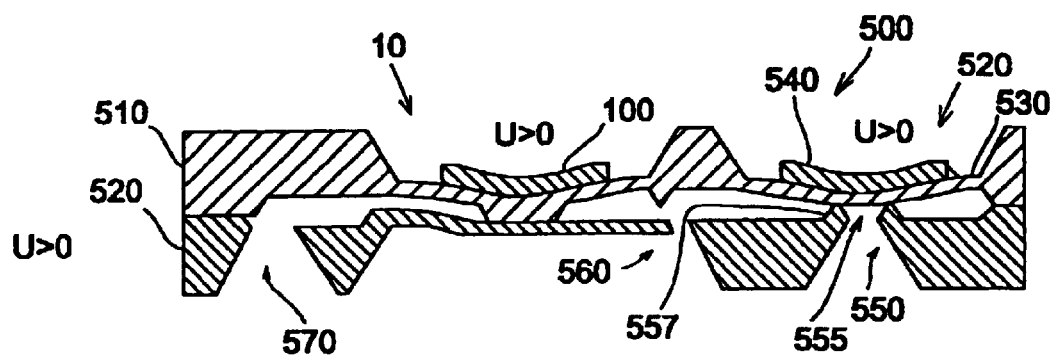
FIGS. 5a and 5b show a side sectional view of an embodiment of a 3/2-way valve comprising the NC valve shown in FIGS. 1a, 1b, 2a and 2b, FIGS. 5a and 5b showing different voltage drive states.
Figure 5B:
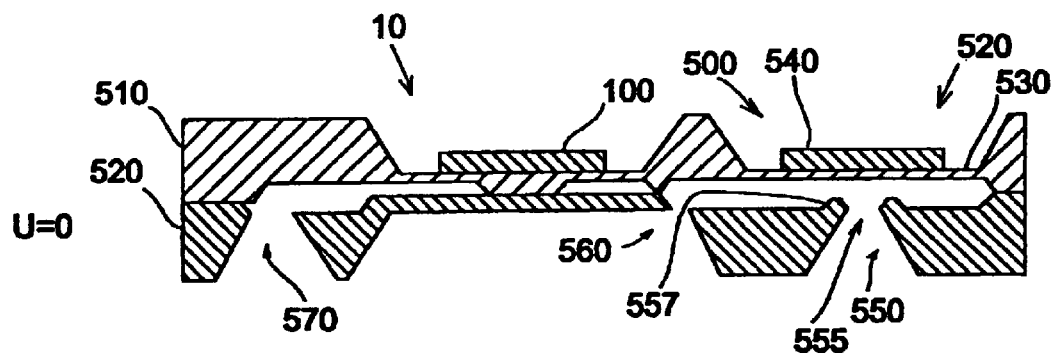

An embodiment of a 3/2-way microvalve will be described with reference to FIGS. 5a and 5b, FIGS. 5a and 5b showing side sectional views of same in different voltage drive states. The 3/2-way microvalve consists of an NC valve 10 such as that shown in FIGS. 1a, 1b, 2a and 2b, and of an NO valve 500, both valves being realized on one chip. In particular, a chip 510 includes the actor chip of NC valve 10 as well as a further dip 520 through which a membrane 530 is formed on which a piezoceramic 540 is mounted. A second chip 520 bonded to the first chip includes, in addition to the flap chip of NC valve 10, an outlet region 550 which extends from a main side of chip 520, which side is facing first chip 510, to that main side of chip 520 which is facing first chip 510, and ends there at an opening 555 surrounded by a sealing lip 557. The architecture of NO valve 500, which consists of a bending converter formed by membrane 530 and piezoceramic 540, and a valve seat which is formed by sealing lip 557 surrounding opening 555, corresponds to the conventional NO valve described with reference to FIGS. 8a and 8b with regard to its mode of operation.

In the 3/2-way valve described above, the input channel region of NC valve 10 serves as an input 560 of the 3/2-way valve, whereas outlet region 550 of NO valve 500 serves as a first output, and the outlet region of NC valve 10 serves as a second output 570. Input 560 or the input channel region of NC valve 10 is in fluidic communication with the region located between membrane 530 and sealing lip 557 of NO valve 500, so that NC valve 10 is connected between input 560 and output 570, and NO valve 500 is connected between input 560 and output 550.

The voltages applied to piezoceramic 100 of NC valve 10 and to piezoceramic 540 of NO valve 500 are driven in a suitable manner so as to produce a valve action between input 560 and the first output 550 and between input 560 and the second output 570. For the purpose of illustrating the mode of operation of the 3/2-way valve, two different voltage drive states are shown in FIGS. 5a and 5b for piezoceramics 100 and 540 of NC valve 10 and of NO valve 500. If a voltage which is positive in the direction of polarization is applied to piezoceramics 100 and 540 of both valves 10 and 500, NC valve 10 is open, whereas NO valve 500 is closed, as can be seen in FIG. 5a. In the normal state, i.e. when no voltage is applied, the NC valve is in its normally closed normal state, whereas NO valve 500 is in an open state.

Using NC valve 10 between input 560 and output 570 of the 3/2-way valve can prevent that, in case of a voltage breakdown, a fluid to be switched passes from input 560 to the second output 570, but it is achieved that same can flow merely from input 560 to output 550, as can be seen in FIG. 5b.

It shall be pointed out, with reference to FIGS. 4, 5a and 5b, that the inventive valve or a plurality of same may be combined at random with other microfluid devices, such as, for example, pumps, valves, so as to form a microfluid system. The microfluid system thus produced may further be realized in a chip, whereby increased switching times can be realized. A valve having an input and two outputs and being self-locking without voltage might be formed, for example, from a NO valve and an NC valve, the input channel region of the NC valve serving as the input, the outlet region of the NC valve serving as a first output, and the outlet region of the NO valve serving as a second output, the region between the bending converter and the valve seat of the NO valve being connected with the region located between the actor membrane and the shutter flap of the NC valve.

Even though in the preceding embodiments the microvalve consisted of two silicon chips and/or isolated silicon wafers, which were bonded together, as the substrates, it shall be pointed out that the microvalve may further be formed differently, such as, for example, by depositing several photolithographically structured layers and etching cavities to be formed. Moreover, the microvalve is not limited to certain materials. In addition to the semiconductor materials described above, the NC valve used may further consist of plastic or other materials suitable for microfluidics.

Even though in the above a bending converter consisting of the actor membrane and the piezoceramic as an actuation means has been used as an actuation means, it is further possible to provide other actuation means. The actuation means might consist, for example, of a piezo stack or of a heating resistor expanding upon an increase in temperature. In this case, the main side, opposing the valve flap, of the actor membrane would oppose a supporting structure between which the heating resistor is arranged. Another possibility would be to apply a pressure to that main side of the actor membrane which is facing away from the valve flap, if the microvalve is to be opened. In this case, the actuation means would consist of one element producing overpressure.

With regard to the tappet described above, it shall be pointed out that same is not absolutely necessary for the operation of the present invention. However, the presence of the tappet is advantageous for reducing the stroke of the actor membrane required to open the valve flap. If a tappet is used, same may exhibit any lateral form, even though it is advantageously limited, in the lateral direction, to a region in the center of the actor membrane, so as not to degrade the bending properties of the actor membrane and so as to be located in the region of the actor membrane with the maximum stroke. It is further not essential whether or not the tappet contacts the valve flap in the normally closed state. In addition, it is possible that the tappet either only contacts the valve flap or is connected to the same. It is further possible to provide the tappet on the valve flap so that the tappet extends from the surface of the valve flap in the direction of the actor membrane.

The following shall be pointed out with regard to the sealing lip. Even though the sealing lip exhibited an essentially triangular cross-section above, it is further possible that same exhibits other cross-sections. Even though it has been described above that the sealing lip surrounds the actor membrane, it is further possible that the sealing lip is provided on the actor membrane; in this case one should make sure that such an arrangement does not deteriorate the bending properties of the actor membrane too much. For the sealing lip it is merely essential that same seals any passageway from the input channel region to the outlet region in the normally closed state of the microvalve. Therefore, the sealing lip might further be arranged such that same does not surround the tappet. In this case the valve flap would be provided such that same exhibits a region extending laterally beyond the extension of the sealing lip so as to seal the input channel region against the outlet region in the normally closed state, and a region upon which the membrane and/or the tappet can act in order to open the valve flap. It shall further be pointed out that the sealing lip might also be arranged on the valve flap, even though provision of the valve flap on the actor chip is preferred so as to prevent too much stiffening of the valve flap.

In accordance with a further embodiment the sealing lip is not guided in a straight line as in FIGS. 2a and 2b, but is guided in a different manner, such as, for example, meander-like or wave-like, so as to increase the length of the sealing lip where the gap between the actor membrane and the valve flap forms. In this way a considerable increase in the throughput rate may be achieved by a slight enlargement of the valve flap, which provides advantages particularly in pneumatics.

Even though embodiments have been described above wherein a valve flap is used as the valve shutter, other valve shutters may further be used which may be deformed by the controllable deformation of the actor membrane. For example, a membrane engaged on two sides may be used instead of a valve flap engaged on one side. In this case, the input channel region will be connected with the outlet region, in the open state of the valve, merely via two opposing gaps between two sealing lips and the membrane acting as the valve shutter. In this case, the sealing lip could not be seen in FIGS. 1a and 1b, but the shutter flap along this edge would also be fixed to the flap chip instead. In the open state, the valve shutter membrane would bend in the form of a cylinder segment with a curvature along the direction between the two edges engaged, so that a gap is formed between the sealing lip and the valve shutter membrane so as to form a passageway, at both other opposing edges of the valve shutter membrane, i.e. upstream and downstream from the drawing plan of FIGS. 1a and 1b. In a similar manner, a valve shutter which is engaged on three sides might be provided, the deformability being reduced, however.

It shall be pointed out, with reference to FIGS. 3, 4, 5a and 5b, that the embodiments shown in them show merely specific possibilities of applying the inventive NC microvalve and that other examples of application are also possible.

What is claimed is:

1. A microvalve with a normally closed state, comprising a membrane;
   an actuation means for controllable deformation of the membrane;
   a valve shutter which is deformable by the controllable deformation of the membrane, which at least partially opposes the membrane, and which rests, in a first position in the normally closed state of the valve, along a sealing lip arranged between the valve shutter and the membrane, the sealing lip being arranged such that an outlet of the valve, which outlet is in fluidic communication with an interrupted section of the sealing lip, is sealed in a fluid-tight manner against an input channel bordering on the valve shutter, and the valve shutter being deformable into a second position so as to bring the outlet into fluidic communication with the input channel in an open state of the valve.

2. The microvalve as claimed in claim 1, wherein, on one side of the membrane, which side is opposite to the valve shutter, a tappet protrudes for pressing against the valve shutter, when the actuation means deforms the membrane.

3. The microvalve as claimed in claim 1, wherein the actuation means is a piezoceramic arranged on a side of the membrane which is facing away from the valve shutter.

4. The microvalve as claimed in claim 1, wherein the valve shutter is a shutter flap engaged near the interrupted section of the sealing lip, and wherein the deformation of the valve shutter is a flapping bending of the shutter flap.

5. The microvalve as claimed in claim 4, wherein the shutter flap is stiffened at one or several parts of the non-engaged locations.

6. The microvalve as claimed in claim 1, wherein the valve shutter is a bendable membrane engaged at two opposing edge sections, one of the edge sections being located near the interrupted section of the sealing lip, and wherein the deformation of the valve shutter is a bending of the bendable membrane.

7. The microvalve as claimed in claim 1, wherein the membrane and the sealing lip are structured into a substrate, and wherein a gap is formed between the sealing lip and the valve shutter due to the deformation of the valve shutter, by which gap the outlet is in fluid communication with the input channel.

8. The microvalve as claimed in claim 2, wherein the sealing lip surrounds the tappet except for the interrupted section.

9. The microvalve as claimed in claim 1, further comprising:
   a first chip in which the membrane which is surrounded by the sealing lip along the edge of the membrane except for an interrupted section, is formed, and
   a second chip which is bonded to the first chip and in which the valve shutter is formed,
   wherein the lateral extension of the valve shutter (180) exceeds at least the lateral extension of the sealing lip, and wherein the valve shutter is connected to the second chip at least near the interrupted section.

10. The microvalve as claimed in claim 9, wherein a tappet bonded to the valve shutter is formed on the membrane.

11. The microvalve as claimed in claim 1, wherein supporting elements are formed between the valve shutter and the membrane so as to prevent, in the normally closed state of the valve, an undesired partial bending of the valve shutter.

12. A microperistaltic pump comprising at least one microvalve with a normally closed state, said microvalve comprising a membrane (80);
   an actuation means (100) for controllable deformation of the membrane (80);
   a valve shutter (180) which is deformable by the controllable deformation of the membrane (80), which at least partially opposes the membrane (80), and which rests, in a first position in the normally closed state of the valve, along a sealing lip (130) arranged between the valve shutter (180) and the membrane (80), the sealing lip (130) being arranged such that an outlet (140) of the valve, which outlet is in fluidic communication with an interrupted section of the sealing lip (130), is sealed in a fluid-tight manner against an input channel (170) bordering on the valve shutter (180), and the valve shutter (180) being deformable into a second position so as to bring the outlet (140) into fluidic communication with the input channel (170) in an open state of the valve.

13. A three/two-way microvalve comprising at least one microvalve with a normally closed state, said microvalve comprising a membrane (80);
   an actuation means (100) for controllable deformation of the membrane (80);
   a valve shutter (180) which is deformable by the controllable deformation of the membrane (80), which at least partially opposes the membrane (80), and which rests, in a first position in the normally closed state of the valve, along a sealing lip (130) arranged between the valve shutter (180) and the membrane (80), the sealing lip (130) being arranged such that an outlet (140) of the valve, which outlet is in fluidic communication with an interrupted section of the sealing lip (130), is sealed in a fluid-tight manner against an input channel (170) bordering on the valve shutter (180), and the valve shutter (180) being deformable into a second position so as to bring the outlet (140) into fluidic communication with the input channel (170) in an open state of the valve.

14. A microfluid system comprising at least one microvalve with a normally closed state, said microvalve comprising a membrane (80);

an actuation means (100) for controllable deformation of the membrane (80);

a valve shutter (180) which is deformable by the controllable deformation of the membrane (80), which at least partially opposes the membrane (80), and which rests, in a first position in the normally closed state of the valve, along a sealing lip (130) arranged between the valve shutter (180) and the membrane (80), the sealing lip (130) being arranged such that an outlet (140) of the valve, which outlet is in fluidic communication with an interrupted section of the sealing lip (130), is sealed in a fluid-tight manner against an input channel (170) bordering on the valve shutter (180), and the valve shutter (180) being deformable into a second position so as to bring the outlet (140) into fluidic communication with the input channel (170) in an open state of the valve.

* * * * *